C. H. DOUGLAS.
METHOD OF FORMING RIVET ENDS OF PIVOT PINS.
APPLICATION FILED SEPT. 27, 1915.
1,247,093.
Patented Nov. 20, 1917.
2 SHEETS—SHEET 1.
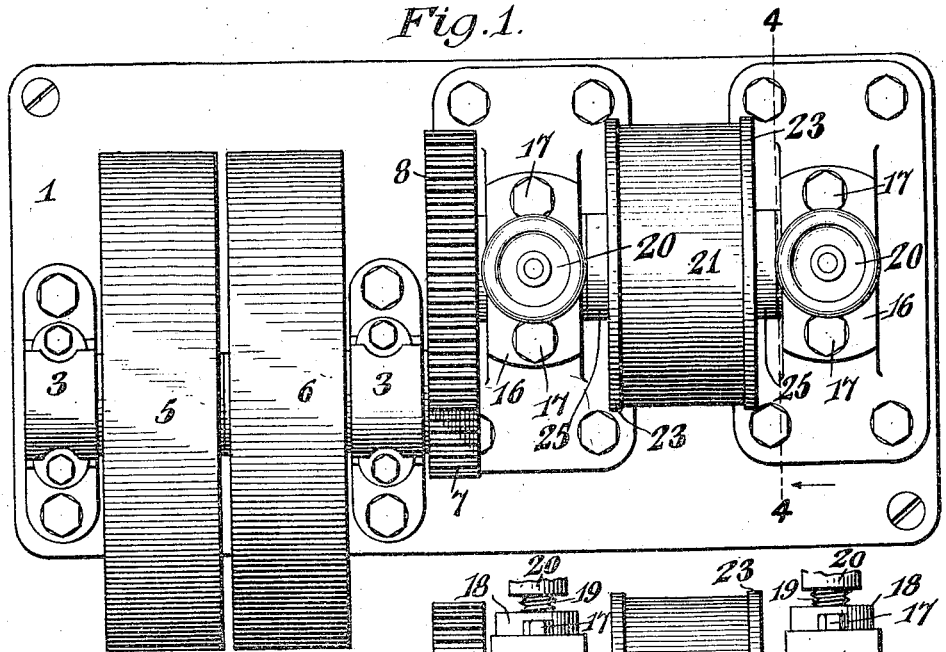
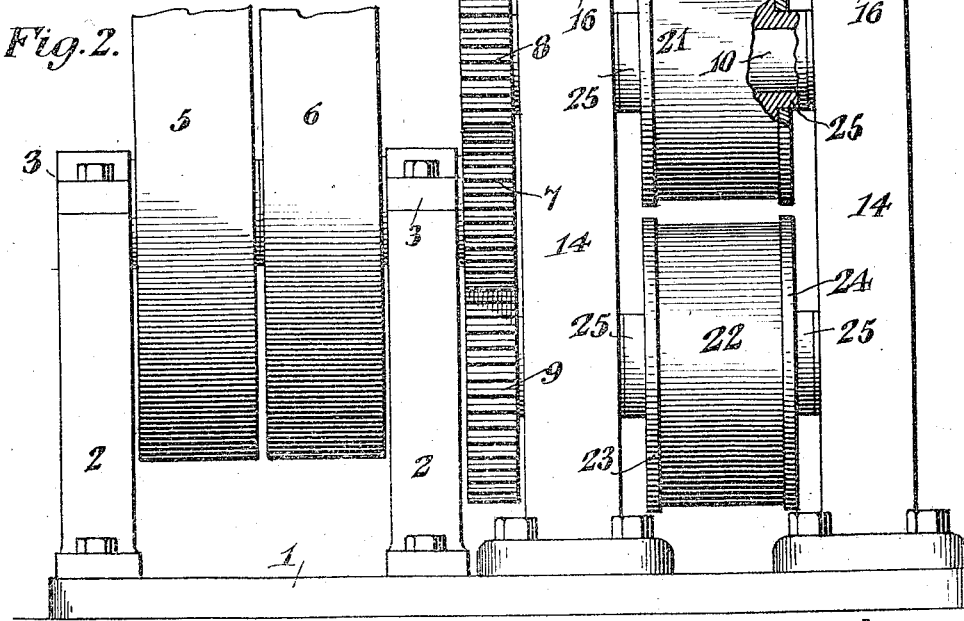
WITNESSES:
Charles H. Douglas, INVENTOR
BY
Attorney C. H. DOUGLAS.
METHOD OF FORMING RIVET ENDS OF PIVOT PINS.
APPLICATION FILED SEPT. 27, 1915.
1,247,093.
Patented Nov. 20, 1917.
2 SHEETS—SHEET 2.
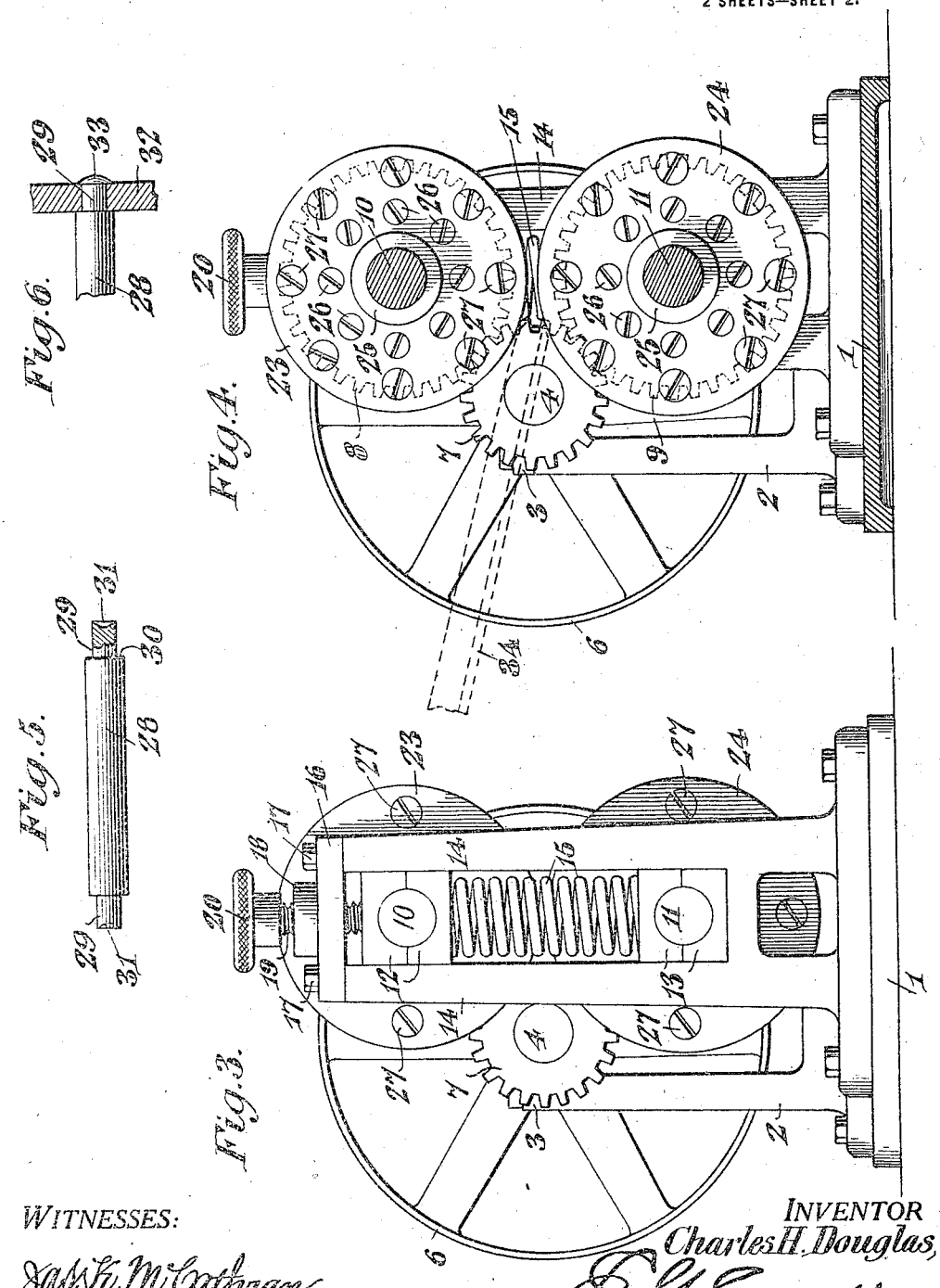
WITNESSES:
INVENTOR
Charles H. Douglas,
BY
Attorney

UNITED STATES PATENT OFFICE.

CHARLES H. DOUGLAS, OF SPRINGFIELD, MASSACHUSETTS, ASSIGNOR TO DOUGLAS SAW & MACHINERY COMPANY, OF BOSTON, MASSACHUSETTS, A CORPORATION OF MASSACHUSETTS.

METHOD OF FORMING RIVET ENDS OF PIVOT-PINS.

1,247,093.  Specification of Letters Patent.  Patented Nov. 20, 1917.

Application filed September 27, 1915. Serial No. 52,944.

*To all whom it may concern:*

Be it known that I, CHARLES H. DOUGLAS, a citizen of the United States, residing at Springfield, in the county of Hampden and State of Massachusetts, have invented a new and useful Method of Forming Rivet Ends of Pivot-Pins, of which the following is a specification.

This invention has reference to a method of forming rivet ends on pivot pins, and its object is to reduce the ends of pivot pins into rivet extensions without removing metal therefrom and without reducing the strength of the ends of the pins, and at the same time so shaping the ends of the pins as to facilitate heading over or riveting such ends.

The invention contemplates the production of pivot pins for drive chains where pivot pins as ordinarily constructed have proven defective, especially when the drive chain is utilized for transmitting heavy loads and is driven at high speed. Trouble is experienced in that the rivet ends of such pivot pins being of smaller diameter than the bodies of the pins frequently break off at the shoulder junction between the rivet ends and the bodies of the pins, this being usually due to the weakening of the rivet end of the pin in its manufacture. It is customary to reduce the diameter of the pivot pin at the ends, so as to provide an abutment shoulder for the outside link or washer, so that the link or washer is firmly united to the pin when the outer end of the rivet extension is headed over.

In accordance with the present invention the rivet extension of reduced diameter is provided by cold-rolling the ends of the blank pivot in such manner that the metal is compacted and the compacted end is lengthened without the metal being at all preliminarily heated, whereby there is produced a rivet extension of practically the same strength as the body of the pivot pin and, furthermore, the expansion of the metal is limited to the surface portions, whereby the end of the rivet extension is cupped and the metal of the inner portions of the rivet extension is not disturbed at all. In this manner the rivet extension remains in most part without any disturbance at all of the metal and what disturbance there is produced in the rivet extension is confined very largely to the surface or the immediate neighborhood thereof.

The method of forming the rivet extension may be practised by means of rollers active on the pivot pin only at the extremities thereof where the rivet extensions are to be formed, and the rollers are so constructed that the pivot pins are rapidly rotated about their longitudinal axes and caused to slowly progress between the rollers in a line of travel perpendicular to the longitudinal axes of the pins. The progressive movement of the pins is accomplished by one roller having a slightly greater peripheral speed than the other where engaging the terminal portions of the pins, whereby the progressive movement is imparted to the pin while being subjected to the compacting action of the rollers.

The invention will be best understood from a consideration of the following detailed description, taken in connection with the accompanying drawings forming part of this specification, with the further understanding that while the drawings show a practical means for practising the invention, any other means suitable for the purpose may be employed.

In the drawings:—

Figure 1 is a plan view of a rolling mill for the pins.

Fig. 2 is a side elevation of the structure of Fig. 1.

Fig. 3 is an end elevation of the machine as viewed from the right hand end of Fig. 1.

Fig. 4 is a section on the line 4—4 of Fig. 1.

Fig. 5 is a plan view of one of the finished pivot pins with one of the rivet extensions in section.

Fig. 6 is a view showing the rivet extension headed on to a plate.

Referring to the drawings, there is shown a base 1 upon which are erected standards 2 provided with journal bearings 3 at their upper ends in which is journaled a shaft 4. Between the standards 2 the shaft 4 carries pulleys 5, 6, respectively, one of which constitutes a tight pulley and the other a loose pulley. The two pulleys may be taken as indicative of any suitable means for driving the shaft and in the particular showing of the drawings it is assumed that the shaft receives power from a belt driven from any suitable source of power.

The shaft 4 at one end carries a pinion 7 meshing with two gear wheels 8, 9, respectively. The gear wheel 8 is fast on one end of a shaft 10 and the gear wheel 9 is fast on one end of a shaft 11. The shaft 10 is mounted in slidable journal blocks 12 and the shaft 11 is mounted in journal blocks 13. The journal blocks 12 and 13 are in turn mounted in upright guide standards 14, there being two such standards spaced apart and secured to the base 1. Extending between each pair of journal blocks 12 and 13, there being two such pairs, is a spring 15, shown as a helical spring, and these springs are sufficiently powerful to sustain the shaft 10 and parts carried thereby. Each standard 14 is provided with a cap member 16 made fast thereto by screws 17 or otherwise, and each cap plate is formed with a boss 18 having threaded through it and the cap plate a screw 19 provided with a manipulating head 20 above the cap plate 16 and at the lower end engaging the journal block 12 in opposition to the spring 15. By means of the screw 19 the journal blocks 12 and the shaft 10 journaled therein may be moved toward the journal blocks 13 and shaft 11, or the shaft 10 may be moved from the shaft 11 by a release of pressure upon the springs 15.

The shaft 10 between the standards 14 carries a roller 21 and the shaft 11 between the standards 14 carries a roller 22, said rollers being fast to the respective shafts. Since the rollers 21 and 22 in themselves perform no work upon the pivot pins to be treated, they may be made of cast iron, but the end faces of the rollers are turned off to receive end plates 23, 24, respectively, which latter are of annular form fitting about the hubs 25 on the rollers and secured to said rollers by series of screws 26, 27.

The plates 23 and 24 constitute the working members of the rollers and have to be renewed from time to time, and consequently are made readily removable from the bodies 21 and 22 of the rollers. Furthermore, the side plates 23 and 24 are subjected to heavy strain, wherefore they are held to the bodies of the rollers by a suitably large number of screws represented in the drawings by the two rows of screws 26 and 27. The plates 23 and 24 because of the work they are called upon to do are specially hardened, which would not be feasible were they in one piece with the roller bodies 21 and 22. One pair of plates, say the plates 24, are made of slightly greater diameter than the other pair of plates, say, the plates 23, so they have a somewhat greater peripheral speed than the plates 23, although the rollers 21 and 22 rotate at the same speed. In the drawings the relative difference in the diameters of the plates 23 and 24 is exaggerated in order that it may be readily observed that there is a difference in diameter. In practice, however, the difference in diameter is represented by a very small fractional portion of an inch.

The machine of Figs. 1, 2, 3 and 4 is designed to produce pivot pins such as indicated at 28 in Fig. 5. These pivot pins have terminal axial extensions 29 producing, where they join the body of the pin, an annular shoulder 30, while the extremity of the extension 29 is more or less cupped, as indicated at 31 in Fig. 5. In the showing of Fig. 5 the relative dimensions are exaggerated and the same is true of Fig. 6 where the extension 29 of the pin 28 passes through a plate 32 and is headed on to the plate 32, as indicated at 33, this heading being facilitated by the cupped end 31 of the extension 29.

In the production of the pivot pins with their rivet extensions 29 the pins are in the form of steel rods made preferably of a tough steel, and, of course, the rods are of a gage suitable for the work to be performed. Furthermore, the rods are slightly less in length than a finished pin, such as indicated in Fig. 5.

The rollers 21 and 22 rotate in the same direction and if it be assumed that the blank pivot pins are fed down a slanting chute 34 to the receiving portions of the rollers, then the two rollers may be assumed, in the showing of Fig. 4, to be rotating clockwise. This means that the upper portion of the roller 22 is rotating clockwise, while the lower portion of the roller 21 adjacent to the upper portion of the roller 22 is also moving clockwise, but oppositely with relation to the adjacent portion of the roller 22. If the plates or disks 22 and 24 were of the same diameter their action would be to merely rotate the blank pins upon their longitudinal axes without progressive movement. However, the plates 24 being of slightly larger diameter than the plates 23 tend to move the pins progressively between the rollers from left to right as viewed in Fig. 4, and the pins while being rotated have their end portions subjected to a rolling compressing action, the compression becoming continuously greater until the pins reach the point of close approach of the side plates. During this travel through the rollers each pin is rotated about its longitudinal axis many times, the number of rotations during the passage of the pin between the rollers being inversely proportionate to the difference of diameter between the plates 23 and 24.

The action of the plates 23 and 24 upon the pivot pins is to both rotate and compress these pins where engaged by the plates and the points of engagement are close to the ends of the pins.

The pins are treated cold, that is, without any heating whatever and the rivet extensions 29 are produced by a compacting of the terminal portions of the pivot pin where engaged between the plates 23 and 24. This likewise causes a moderate elongation of the compacted portions of the pivot pin resulting in its elongation being largely localized to the surface portions of the forming rivet extension, wherefore the interior portions of the extension are not disturbed, but retain their original relation to the body of the pin. The projection of the surface portions of the rivet extensions caused by the compacting action of the roller plates 23 and 24 produces a cupping of the ends of the rivet extensions 29, so that when these cupped portions are upset in the production of the rivet heads to secure the rivet extensions to a plate, such as the plate 32, such riveting is greatly facilitated, since there is but a minimum disturbance of the metal in the riveting over or upsetting of the end of the rivet extension.

The result of all this is that there is no material weakening of the rivet extensions, although of somewhat less diameter than the body of the pivot pin and the rivet extensions are found to be in practice of so nearly the same strength as the body of the pivot pin that breakage of the rivet extensions is practically eliminated. This is believed to be due to the cold rolling which in no wise affects the temper of the material of the pin, and also to the compacting of the surface of the reduced portion without removing any metal. Furthermore, the disturbance of the metal of the rivet extension is largely localized to the surface portion thereof, and the interior portions of the extension so produced in most part retain their original condition. In hot rolling where the metal is more or less softened by heat, the disturbance of the material in the formation of a rivet extension is practically all the way through the metal and such disturbance results in a weakening of the rivet extension, which weakening does not appear to occur in cold rolling the rivet extensions on the pins in the manner herein described.

The pivot pins produced in the manner hereinbefore described are designed particularly for use in connection with drive chains intended to carry heavy loads at high speed. For instance, pivot pins produced in accordance with this invention have been sucessfully employed in drive chains running at a linear speed of more than three thousand feet per minute, and transmitting about twenty-five horse power, and the pivot pins have stood up under such a test where pivot pins as ordinarily constructed have failed to stand such test.

While the invention has been described with especial reference to pivot pins, such as are employed in drive chains, it is to be understood that the invention is not limited to such particular use or the production of such particular article, but may be employed for other purposes, as, for instance, where a local reduction in gage is desirable without any sacrifice in strength by such local reduction.

What is claimed is:—

1. The method of producing rivet extensions on the extremities of pivot pins, which consists in causing a reduction in gage of the extremities of the pin by cold rolling, and thereby producing a compacting and elongation of the surface portion of the part subjected to compression, whereby the terminal portion of the compressed part is cupped by such surface elongation.

2. The method of producing rivet extensions of the ends of pivot pins, which consists in subjecting the ends of the pins to progressively increasing compression in a direction perpendicular to the longitudinal axis of the pin while said pin is rotated about its longitudinal axis and the pin is at atmospheric temperature, whereby the end portions of the pin are compressed and elongated with such compression and elongation localized to the surface portions of the parts of the pin acted upon.

3. The method of producing reduced gage rivet extensions at the end portions of pivot pins, which consists in subjecting such end portions while cold to compression, while the pin is being rotated about its longitudinal axis and progressing slowly as compared to its speed of rotation with a degree of compression increasing with the progress of the pin, whereby the surface portions of the ends of the pin corresponding to the rivet extensions are compressed and elongated with the interior parts of the rivet extensions undisturbed.

In testimony, that I claim the foregoing as my own, I have hereto affixed my signature in the presence of two witnesses.

CHARLES H. DOUGLAS.

Witnesses:
   JOHN H. SIGGERS,
   JOHN R. RAY.

Copies of this patent may be obtained for five cents each, by addressing the "Commissioner of Patents, Washington, D. C."